United States Patent
Takahashi et al.

(10) Patent No.: US 7,855,765 B2
(45) Date of Patent: Dec. 21, 2010

(54) LIQUID CRYSTAL DISPLAY DEVICE

(75) Inventors: Yoshiaki Takahashi, Chiba (JP); Masayuki Mifune, Mobara (JP); Ken Kagabu, Ichinomiya (JP); Hidehiro Hanada, Ichihara (JP); Nobuyuki Suzuki, Isumi (JP)

(73) Assignees: Hitachi Displays, Ltd., Chiba-ken (JP); Hitachi Display Devices, Ltd., Chiba-ken (JP)

( * ) Notice: Subject to any disclaimer, the term of this patent is extended or adjusted under 35 U.S.C. 154(b) by 145 days.

(21) Appl. No.: 12/230,911

(22) Filed: Sep. 8, 2008

(65) Prior Publication Data
US 2009/0073347 A1    Mar. 19, 2009

(30) Foreign Application Priority Data
Sep. 14, 2007    (JP) ............................... 2007-238671

(51) Int. Cl.
*G02F 1/1335* (2006.01)
(52) U.S. Cl. .............................. 349/65; 349/61; 349/64; 349/63
(58) Field of Classification Search ................ 349/64, 349/63, 62, 61, 58, 56, 70, 116, 139, 158, 349/65
See application file for complete search history.

(56) References Cited

U.S. PATENT DOCUMENTS

| | | | | |
|---|---|---|---|---|
| 5,453,855 A | * | 9/1995 | Nakamura et al. ............ | 349/58 |
| 6,139,162 A | * | 10/2000 | Masaki ....................... | 362/618 |
| 6,247,826 B1 | * | 6/2001 | Funamoto et al. ........... | 362/603 |
| 6,312,787 B1 | * | 11/2001 | Hayashi et al. .............. | 428/156 |
| 7,188,989 B2 | * | 3/2007 | Miyashita ................... | 362/621 |
| 2004/0130912 A1 | * | 7/2004 | Miyashita ................... | 362/561 |
| 2006/0181901 A1 | * | 8/2006 | Sakai et al. .................. | 362/613 |
| 2009/0073347 A1 | * | 3/2009 | Takahashi et al. ............. | 349/65 |

FOREIGN PATENT DOCUMENTS

JP    11-260136    9/1999

* cited by examiner

*Primary Examiner*—Brian M Healy
(74) *Attorney, Agent, or Firm*—Stites & Harbison, PLLC; Juan Carlos A. Marquez, Esq.

(57) ABSTRACT

In a backlight which arranges light emitting diodes on a side surface of a light guide plate, even when the light emitting diodes having a thickness larger than a thickness of the light guide plate are used, it is possible to manufacture the light guide plate with high accuracy by injection molding. In a liquid crystal display device having a backlight which radiates light to a liquid crystal panel, LEDs are mounted on the light guide plate formed on the backlight as a light emitting element, and an S-shaped inclined portion whose thickness is not changed is formed on the light guide plate from a light incident surface to a light emitting surface of the light guide plate. Since the thickness of the inclined portion is not changed, it is possible to make the pressure of resin flow at the time of performing injection molding uniform thus manufacturing the light guide plate with high accuracy.

12 Claims, 10 Drawing Sheets

FIG.10B

LIQUID CRYSTAL DISPLAY DEVICE

BACKGROUND OF THE INVENTION

1. Field of the Invention

The present invention relates to a light source of a non-selfluminous display device, and more particularly to a liquid crystal display device having a backlight which includes a light guide plate and uses an LED as a light source.

2. Background Art

Recently, the liquid crystal display device has been popularly used as a display device. Particularly, the liquid crystal display device is used as a display part of portable equipment because the liquid crystal display device is thin and light-weighted, and consumes small electric power.

However, the liquid crystal display device is not self-luminous and hence, the liquid crystal display device requires a lighting means. In general, as a lighting device which is used for the liquid crystal display device, a planar lighting device referred to as a backlight is popularly used. Conventionally, although a cold cathode fluorescent lamp has been used as a light emitting element (also referred to as a light source) of the backlight, an LED (light emitting diode) has been also recently used as the light emitting element.

The backlight includes a plate-shaped light guide plate. A material of the light guide plate is a light transmitting resin or the like, and light incident on the light guide plate from the light emitting element propagates in the inside of the light guide plate. A reflection/scattering member such as grooves, projections or a printed material is formed on the light guide plate, and the light which propagates in the inside of the light guide plate due to such a reflection/scattering member is directed and radiated toward a liquid crystal display device side.

When LEDs are used as a light emitting element, there arises a drawback that a thickness of the LEDs is larger than a thickness of the light guide plate. Accordingly, as disclosed in JP-A-11-260136, for example, there has been proposed the constitution of a light guide plate which changes a thickness thereof in two stages, wherein a thickness of the light guide plate is made large at a light entering surface on which light is incident from a light source, and the thickness of the light guide plate at a light radiation surface is set smaller than the thickness of the light guide plate at the light entering surface thus forming an inclined surface extending toward the light radiation surface from the light entering surface. However, the technique described in JP-A-11-260136 is provided for preventing leaking of light by making use of an angle of the inclined surface, and the technique does not take leaking of light from the inclined surface when a thickness of the light radiation surface is further decreased or a method of forming the light guide plate into consideration.

SUMMARY OF THE INVENTION

When the inclined surface is formed on the light guide plate, some light is radiated from the inclined surface thus causing undesired leaking of light. Further, when the thickness of the light guide plate is changed in two stages, there arises a drawback that a resin is not uniformly filled in forming the light guide plate.

It is an object of the present invention to provide a liquid crystal display device including a display panel, a backlight which radiates light to the display panel, a light emitting element which is mounted on the backlight, and a light guide plate on which light from the light emitting element is incident, wherein the light emitting element is mounted on a side surface of the light guide plate, and an inclined portion which is inclined in an S-shape is formed between a light entering portion and a light radiation portion of the light guide plate in a state that the front surface and the rear surface of the light guide plate extend in the same direction thus making a thickness of the light guide plate uniform.

By forming the S-shaped inclined portion which forms the inclined surface on both front and back surfaces thereof between the light entering portion and the light radiation portion of the light guide plate, it is possible to make a pressure necessary for filling a resin at the time of forming the light guide plate uniform. Further, leaking of light from the inclined surfaces can be prevented.

DETAIL DESCRIPTION OF THE EMBODIMENTS

In a liquid crystal display device including a liquid crystal panel and a planar lighting device which radiates light to the liquid crystal panel, the planar lighting device includes a light guide plate having a light radiation surface and a bottom surface which faces the light radiation surface in an opposed manner. Further, the light guide plate includes side surfaces which intersect with the light radiation surface and the bottom surface. A plurality of LEDs is arranged along the first side surface of the light guide plate. The first side surface forms a light incident surface of the light guide plate by allowing light from the LEDs to be incident on the light guide plate from the first side surface. The light incident on the light guide plate is directed toward a light-radiation-surface side by a scattering member mounted on the bottom surface of the light guide plate, and is radiated from the light radiation surface. The light guide plate includes an S-shaped inclined portion extending toward a light radiation surface side from a light incident surface side. The S-shaped inclined portion forms an inclined surface on both front and back surfaces thereof and these inclined surfaces are inclined in the same direction thus allowing the light guide plate to have the same thickness toward the light incident surface side from the light radiation surface side.

Figure 1:
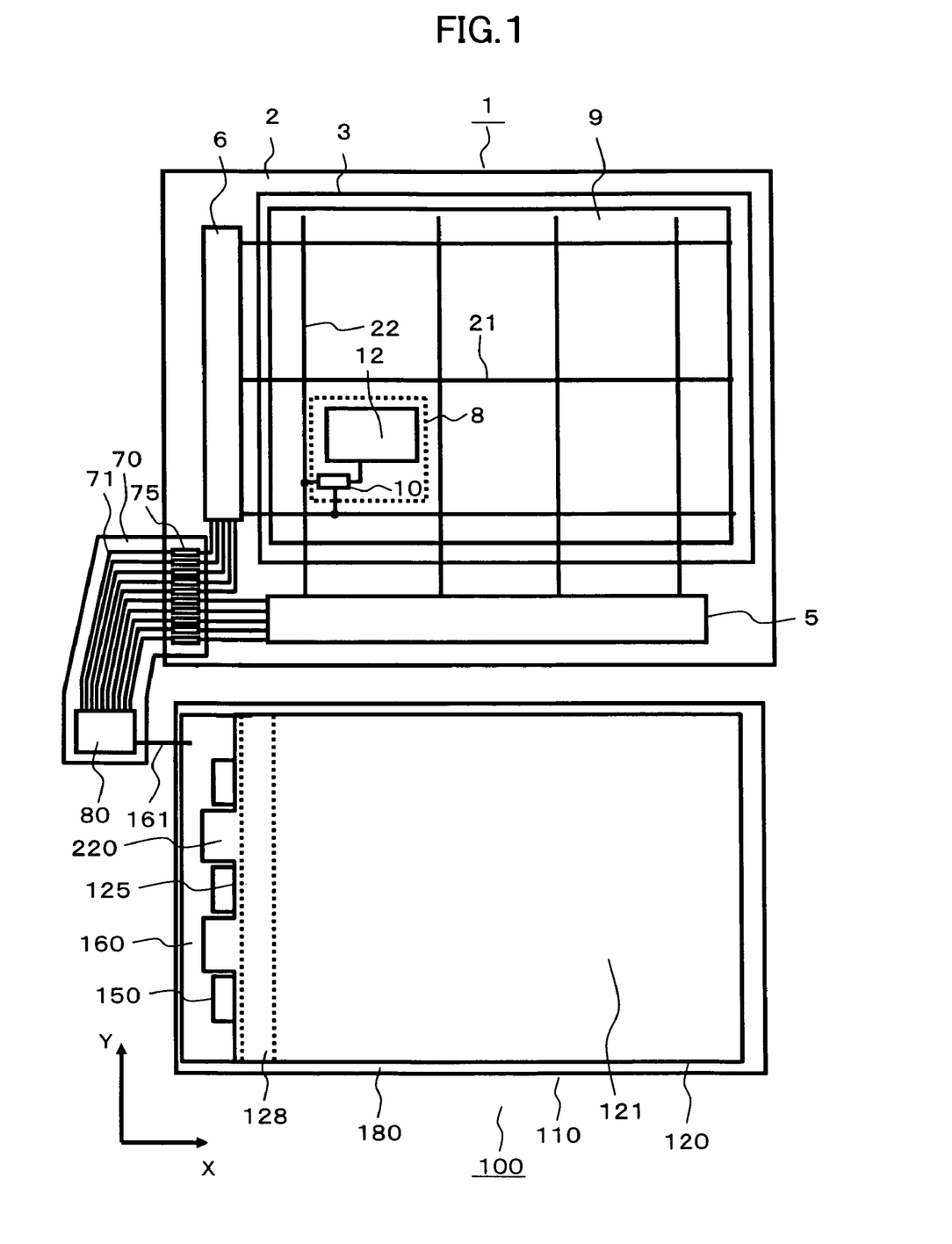
FIG. 1 is a block diagram showing the schematic constitution of a liquid crystal display device of an embodiment according to the present invention.

FIG. 1 is a plan view showing a liquid crystal display device 100 according to the present invention. The liquid crystal display device 100 is constituted of a liquid crystal panel 1, a backlight 110 and a control circuit 80. Signals and power source voltages necessary for a display of the liquid crystal display device 100 are supplied from the control circuit 80. The control circuit 80 is mounted on a flexible printed circuit board 70, and signals are transmitted to the liquid crystal panel 1 via lines 71 and terminals 75.

The backlight 110 is constituted of a light guide plate 120, LEDs 150 and a housing casing 180. The backlight 110 is provided for radiating light to the liquid crystal panel 1. The liquid crystal panel 1 performs a display by controlling a transmission quantity or a reflection quantity of light radiated from the backlight 110. Here, the backlight 110 is mounted on a back-surface side or a front-surface side of the liquid crystal panel 1 in a stacked manner as viewed from a viewer. However, in FIG. 1, to facilitate the understanding of the constitution of the liquid crystal display device, the backlight 110 is shown in a state that the backlight 110 is arranged parallel to the liquid crystal panel 1.

The light guide plate 120 has a substantially rectangular shape, and the LEDs 150 are arranged on the side surface thereof. Numeral 160 indicates a flexible printed circuit board which electrically connects the plurality of LEDs 150 with each other. The flexible printed circuit board 160 and the control circuit 80 are electrically connected with each other by lines 161.

A side surface 125 on which the LEDs 150 are arranged is referred to as a light incident surface or a light entering surface, and the light is incident on the light guide plate from the light incident surface 125. The light incident on the light guide plate 120 from the light incident surface 125 is radiated from a light radiation surface 121. An inclined portion 128 is formed between the light incident surface 125 and the light radiation surface 121 for guiding the light incident from the light incident surface 125 to the light radiation surface 121. Here, the inclined portion 128 is explained in detail later.

Next, the liquid crystal panel 1 is explained. The liquid crystal panel 1 includes two substrates consisting of a TFT substrate 2 and a color filter substrate 3 which overlap with each other, and the liquid crystal composition sandwiched between these two substrates. Pixel portions 8 are arranged on the TFT substrate 2, and each pixel portion 8 includes a pixel electrode 12. Here, although the liquid crystal panel includes a large number of pixel portions 8 arranged in a matrix array, to prevent the drawing from becoming complicated, only one pixel portion 8 is shown in FIG. 1. The pixel portions 8 arranged in a matrix array form a display region 9, each pixel portion 8 plays a role of a pixel of a displayed image, and an image is displayed in the display region 9.

In FIG. 1, gate signal lines (also referred to as scanning lines) 21 which extend in the x direction and are arranged parallel to each other in the y direction in the drawing, and drain signal lines (also referred to as video signal lines) 22 which extend in the y direction and are arranged parallel to each other in the x direction in the drawing are provided. The gate signal lines 21 and the drain signal lines 22 intersect with each other. Further, each pixel portion 8 is formed in a region surrounded by the gate signal lines 21 and the drain signal lines 22.

A switching element 10 is provided to the pixel portion 8. A control signal is supplied to the switching element 10 via the gate signal line 21 so as to control an ON/OFF state of the switching element 10. When the switching element 10 is turned on, a video signal transmitted via the drain signal line 22 is supplied to the pixel electrode 12.

The drain signal lines 22 are connected to a drive circuit 5, and the video signals are outputted to the drain signal lines 22 from the drive circuit 5. The gate signal lines 21 are connected to a drive circuit 6, and the control signals are outputted to the gate signal lines 21 from the drive circuit 6. Here, the gate signal lines 21, the drain signal lines 22, the drive circuit 5 and the drive circuit 6 are formed on the same TFT substrate 2. Further, in addition to the drive circuit 5 and the drive circuit 6, the control circuit 80 can be formed on one semiconductor chip.

Figure 2A:
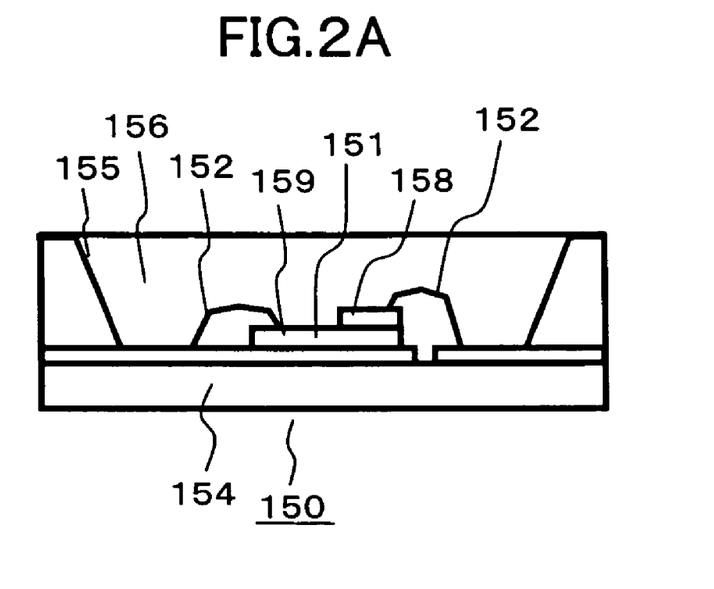
FIG. 2A and FIG. 2B are schematic views showing a light emitting diode of the liquid crystal display device of the embodiment according to the present invention.
Figure 2B:
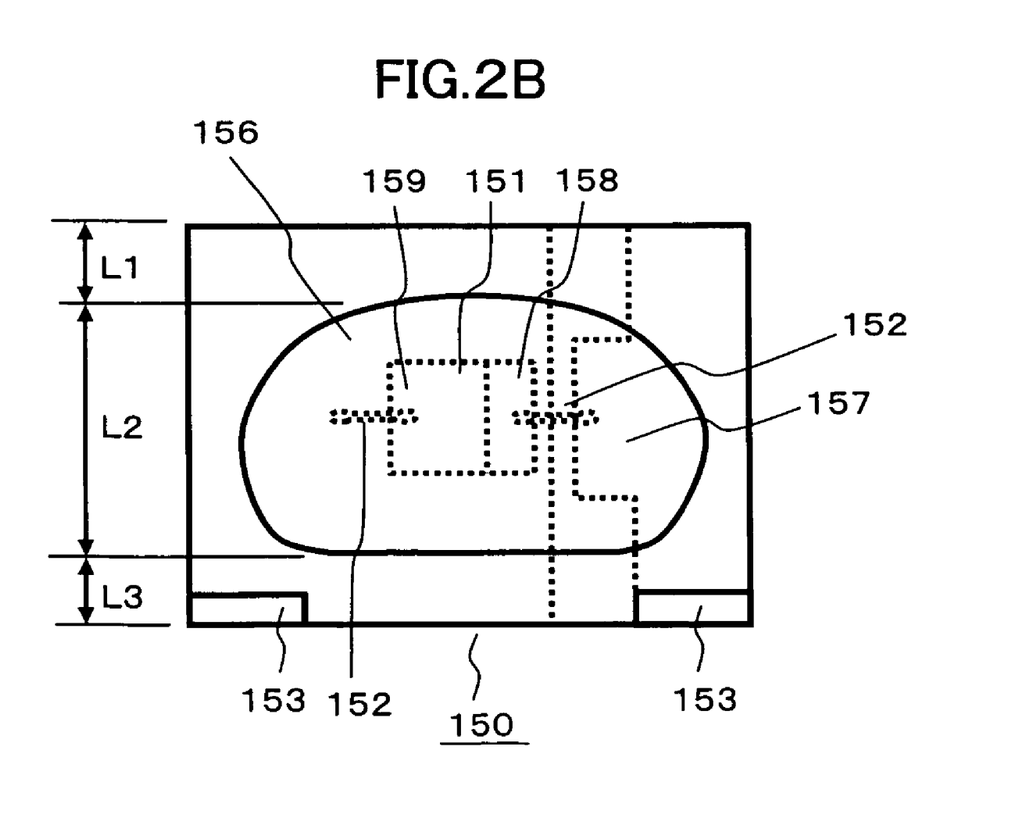

Next, FIG. 2A and FIG. 2B are schematic views showing the LED 150 which constitutes a light emitting element, wherein FIG. 2A is a schematic cross-sectional view of the LED 150, and FIG. 2B is a front view of the LED 150 as viewed from a light-emission side.

The LED 150 is configured such that an LED chip 151 which constitutes a light emission portion is mounted on a chip substrate 154. The LED chip 151 has a pn junction and, when a voltage is applied to the pn junction, the LED chip 151 emits light at a specified wavelength. A p electrode (anode) 158 is formed on a p-type semiconductor layer which forms the pn junction, and an n electrode (cathode) 159 is formed on an n-type semiconductor layer which forms the pn junction.

Wires 152 are respectively connected to the p electrode 158 and the n electrode 159. Chip terminals 153 are provided for connecting the LED 150 to an external portion, and the chip terminals 153 are electrically connected with the p electrode 158 and the n electrode 159 using the wires 152.

A fluorescent light emission part 156 may be arranged on a light-radiation-surface side of the LED chip 151. The fluorescent light emission part 156 has a function of converting a wavelength of light emitted from the LED chip 151. Numeral 155 indicates a reflection portion, and the reflection portion 155 reflects light toward a front side.

A light emission portion 157 from which light is radiated is formed on a front surface side of the LED 150. A width of the light emission portion 157 is indicated by symbol L2. Accordingly, light is not radiated from portions of the LED 150 having thicknesses indicated by symbols L1, L3 respectively. As described above, a thickness of the LED 150 is the sum of thicknesses L1, L2, and L3 (L1+L2+L3), and the thickness L2 of the light emission portion 157 from which light is actually radiated is set smaller than the thickness of the LED 150.

Figure 3A:
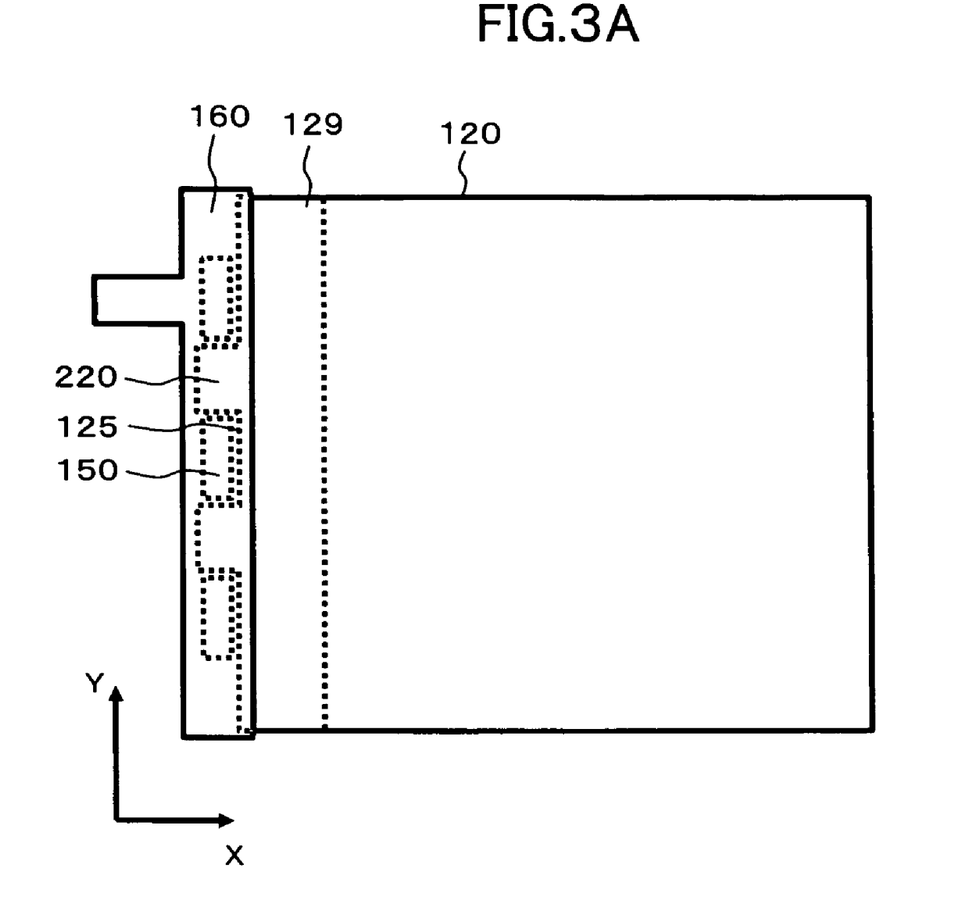
FIG. 3A and FIG. 3B are schematic views showing a light guide plate of the liquid crystal display device of the embodiment according to the present invention.
Figure 3B:
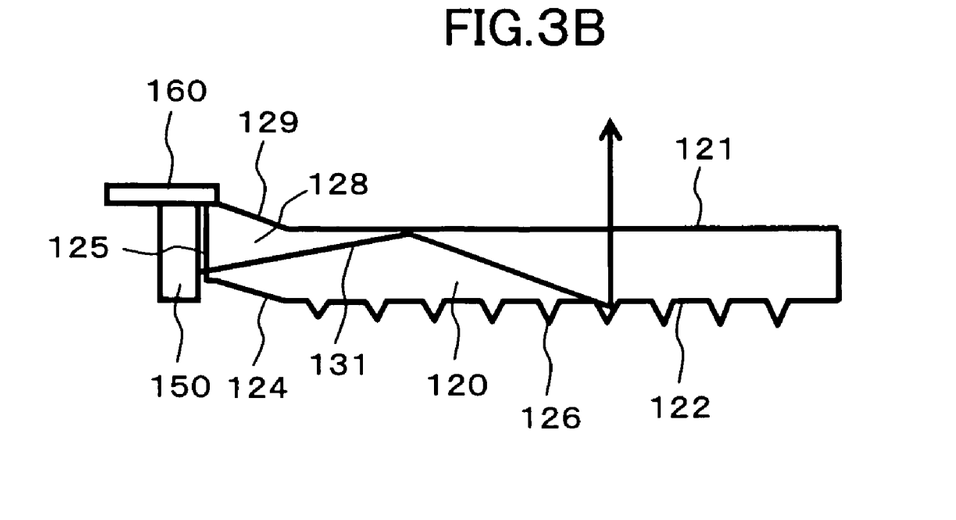

Next, FIG. 3A is a schematic plan view of the light guide plate 120, and FIG. 3B is a schematic side view of the light guide plate 120. As shown in FIG. 3A, the light guide plate 120 is formed into an approximately rectangular shape and, as shown in FIG. 3B, the light guide plate 120 includes an upper surface (also referred to as a light radiation surface) 121 and a lower surface 122. The light guide plate 120 is made of a material such as an acrylic resin or a polycarbonate which allows light to pass therethrough. The light guide plate 120 is formed into a plate shape, and a thickness of the light guide plate 120 is set to 0.2 mm to 1.0 mm.

In FIG. 3B, while a cross section of the light guide plate 120 has an approximately rectangular shape, an S-shaped inclined portion 128 is formed toward the light radiation surface 121 from the light incident surface 125. The inclined surface 128 includes a first inclined surface 129 formed on an upper-surface-121 side thereof and a second inclined surface 124 on a lower-surface-122 side thereof.

The inclined portion 128 is effectively applicable to a case that the thickness of the LED 150 is set larger than the thickness of the light radiation surface 121 of the light guide plate 120. Due to such a constitution, even when the lower surface of the light guide plate 120 is arranged below a lower end of the light emission portion 157 of the light emitting element (LED 150), the inclined portion 128 efficiently guides light which is incident on the light guide plate 120 from the light incident surface 125 toward the light radiation surface 121.

As described previously, the thickness L2 of the light emission portion 157 is smaller than the thickness of the LED 150 and hence, the light incident surface 125 is formed in conformity with the thickness L2 of the light emission portion 157. By forming the light incident surface 125 in conformity with the thickness L2 of the light emission portion 157, light radiated from the LED 150 can be efficiently incident on the light guide plate 120. Here, a detailed shape and the like of the inclined portion 128 are described later.

In FIG. 3A and FIG. 3B, the positional relationship among the light guide plate 120, the LED 150 and the flexible printed circuit board 160 is also shown. On at least one side of the light guide plate 120, the light incident surface 125 is arranged and, in the vicinity of the light incident surface 125, a plurality of LEDs 150 is arranged. The LEDs 150 are arranged below the flexible printed circuit board 160 and along the light incident surface 125.

An adhesive sheet (not shown in the drawing) is arranged on a light-guide-plate-120 side of the flexible printed circuit board 160, and the flexible printed circuit board 160 is adhered and fixed to the light guide plate 120 using the adhesive sheet. By adhering and fixing the flexible printed circuit board 160 to the light guide plate 120, a position of the LED 150 can be adjusted with respect to the light incident surface 125.

For increasing an adhering area between the flexible printed circuit board 160 and the light guide plate 120 due to the adhesive sheet, projecting portions 220 are formed. The projecting portions 220 may be formed on a light incident surface 125 of the light guide plate 120 in a state that the LED 150 is sandwiched between the projecting portions 220. By adhering the projecting portions 220 and the flexible printed circuit board 160 to each other, it is possible to adjust the position of the LED 150 with respect to the light guide plate 120 with high accuracy.

Next, light 131 which is emitted from the LED 150 is explained in conjunction with FIG. 3B. The light 131 emitted from the LED 150 is incident on the light guide plate 120 from the light incident surface 125. A refractive index of the light guide plate 120 is larger than a refractive index of air and hence, light which reaches the light incident surface 125 at an angle larger than a specified angle with respect to the direction perpendicular to the light incident surface 125 is reflected on the light incident surface 125, while light which reaches the light incident surface 125 at an angle smaller than the specified angle with respect to the direction perpendicular to the light incident surface 125 enters the inside of the light guide plate 120.

The upper surface 121 and the lower surface 122 of the light guide plate 120 are arranged to be substantially orthogonal to the light incident surface 125, and the light which enters the inside of the light guide plate 120 advances in the inside of the light guide plate 120 while repeating the total reflection between the upper surface 121 and the lower surface 122 of the light guide plate 120. Grooves 126 having a V-shaped cross section are formed in the lower surface 122 as reflection portions. A part of the light which advances through the light guide plate 120 is reflected toward the upper-surface-121 side on the grooves 126 formed in the lower surface 122, and is radiated from the upper surface 121. Here, the explanation is made with respect to a case in which the reflection portion is formed of the grooves 126 having a V-shaped cross section as one example. However, any reflection portion may be used provided that the reflection portion has a function of directing the light which advances in the inside of the light guide plate toward the upper-surface-121 side. For example, white dots formed by printing or the like may be used as the reflection portions.

Figure 4A:
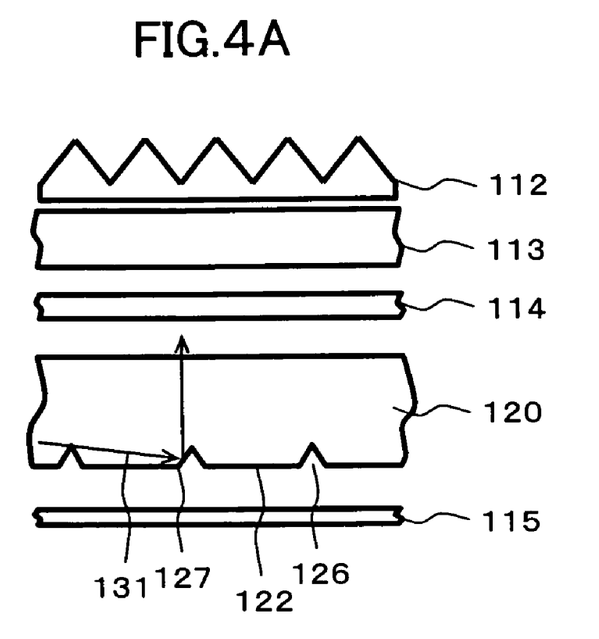
FIG. 4A and FIG. 4B are schematic cross-sectional views showing the light guide plate of the liquid crystal display device of the embodiment according to the present invention.
Figure 4B:
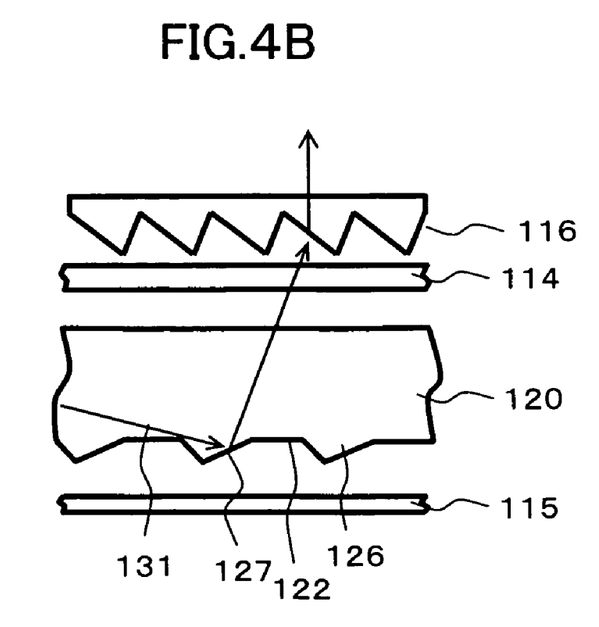

Next, the light which is reflected on the grooves 126 is explained in conjunction with FIG. 4A and FIG. 4B. FIG. 4A shows a case in which the grooves 126 are recessed inwardly, while FIG. 4B shows a case in which the grooves 126 project outwardly. Each groove 126 includes a reflection surface (also referred to as an inclined surface) 127, wherein the reflection surface 127 makes an angle of 1 to 35 degrees with respect to the lower surface 122. The light which is reflected on the reflection surface 127 is reflected toward the upper surface of the light guide plate 120. By reflecting the light on the reflection surface 127, it is possible to set an angle of light with respect to the upper surface 121 to an angle which allows the light to be radiated from the upper surface 121. That is, although the light repeats the total reflection in the inside of the light guide plate 120 as described above, due to the formation of the reflection surfaces 127, the angle of the light with respect to the upper surface 121 becomes an angle which allows the radiation of light from the light guide plate 120 so that the light radiates from the light guide plate 120.

As shown in FIG. 4A, prism sheets 112, 113 are arranged on the upper surface 121 of the light guide plate 120 so as to control the direction of light radiated from the light guide plate 120. Here, in FIG. 4A, the prism sheets 112, 113 are arranged in a state that ridges of triangular columns of the prism sheet 112 and ridges of triangular columns of the prism sheet 113 intersect with each other. Accordingly, the prism sheet 113 can refract the advancing direction of light which is radiated from the light guide plate 120 in the lateral direction thus directing the light toward the inside (liquid-crystal-panel side). Here, numeral 114 indicates a diffusion plate, and numeral 115 indicates a reflection sheet.

Next, FIG. 4B shows a case in which one sheet of asymmetric prism sheet is used. The light which is reflected on the reflection surface 127 makes an obtuse angle with respect to the perpendicular direction of the upper surface 121, and the light is radiated from the upper surface 121 such that the light expands outwardly (toward a right side in the drawing). On the light guide plate 120, an asymmetrical prism sheet 116 is formed so as to refract the outgoing light toward a liquid-crystal-panel (not shown in the drawing) side.

Figure 5A:
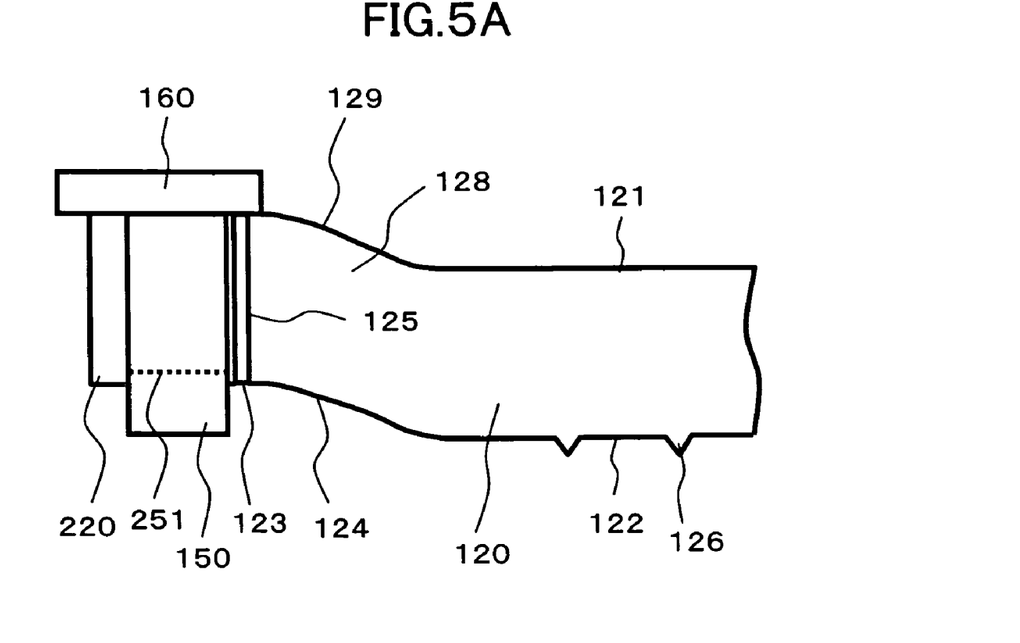
FIG. 5A and FIG. 5B are schematic cross-sectional views showing the vicinity of a light entering surface of the light guide plate of the liquid crystal display device of the embodiment according to the present invention.
Figure 5B:
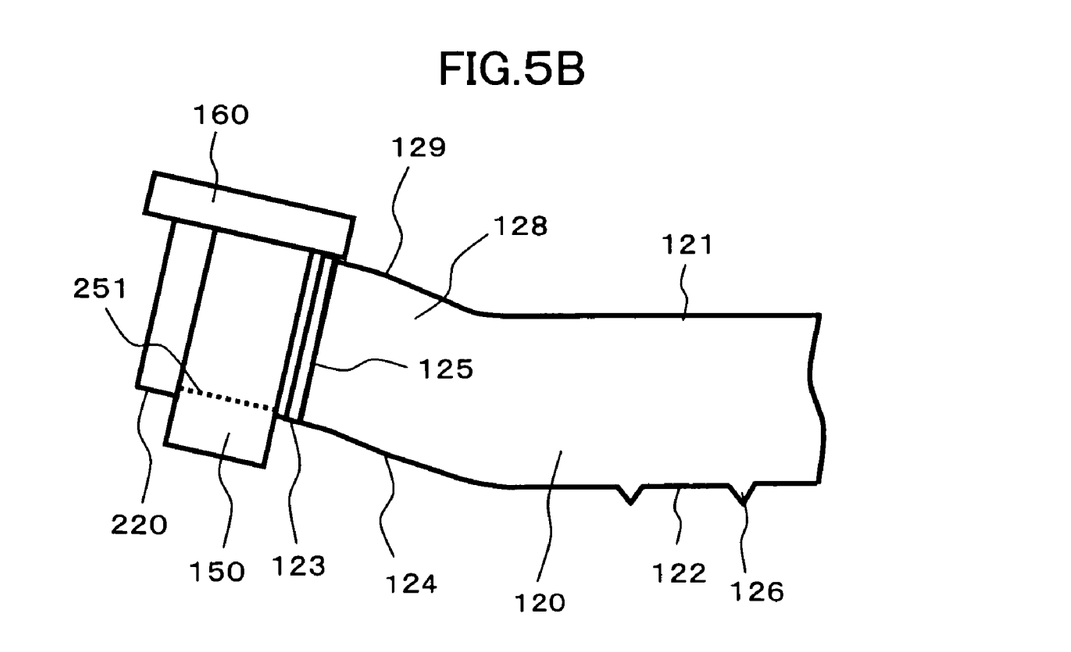

FIG. 5A and FIG. 5B are cross-sectional views showing the vicinity of the light entering surface 125 of the light guide plate 120. The inclined portion 128 is formed in the vicinity of the light incident surface 125 of the light guide plate 120. On the inclined portion 128, a first inclined surface 129 which extends to the upper surface 121 from the light-entering-surface-125 side, and a second inclined surface which extends to the lower surface 122 from the light-entering-surface-125 side are formed. Numeral 123 indicates a lens mounted on the light entering surface 125, and the lens 123 has a function of scattering light incident from the light entering surface 125.

As shown in FIG. 2, the light emission portion 157 is formed in the LED 150 which constitutes a light emitting element, and portions from which light is not radiated are arranged above and below the light emission portion 157. The portions from which the light is not radiated respectively have the widths L1, L3. In the LED 150 shown in FIG. 5A, a boundary between the width L1 and the width L2 is indicated by a dotted line 251. Hereinafter, the dotted line 251 is also referred to as a lower end of the light emission portion 157.

When the light guide plate 120 is made thin, the thickness of the LED 150 becomes larger than the thickness of the light guide plate 120 defined between the upper surface 121 and the lower surface 122. Accordingly, by aligning the lower end of the light entering surface 125 with the lower end 251 of the light radiation surface 157 of the LED and by making the thickness of the light entering surface 125 equal to the thickness of the light emission portion 157, it is possible to allow light to be efficiently incident on the light entering surface 125.

The second inclined surface 124 which extends toward the lower surface 122 from the lower end 251 of the light emission surface 157 is formed on the light guide plate 120. Due to the provision of the second inclined surface 124, it is possible to guide the light which is incident on the inclined surface 124 toward the lower surface 122 even when the lower surface 122 is arranged below the lower end 251 of the light emission surface 157. Further, the first inclined surface 129 and the second inclined surface 124 are inclined in the same direction and hence, the light can efficiently advance in the inside of the light guide plate 120 while repeating the total reflection between the first inclined surface 129 and the second inclined surface 124.

In FIG. 5A, the first inclined surface 129 and the second inclined surface 124 are respectively formed in an S-shape so that the thickness between the first inclined surface 129 and the second inclined surface 124 is substantially equal to the thickness between the upper surface 121 and the lower surface 122. The first inclined surface 129 and the second inclined surface 124 are arranged substantially parallel to each other and hence, there exists no possibility that the light which is reflected on the first inclined surface 129 takes an angle which allows the light to be radiated from the opposing second inclined surface 124 and the light which is reflected on the second inclined surface 124 takes an angle which allows the light to be radiated from the opposing first inclined surface 129.

Further, the first inclined surface 129 and the second inclined surface 124 substantially orthogonally intersect with the light entering surface 125. Further, the first inclined surface 129 is connected to the upper surface 121 with a gentle radius of curvature, and the second inclined surface 124 is connected to the lower surface 122 with a gentle radius of curvature in the same manner as the first inclined surface 129.

Further, by forming the inclined portion 128 into an S-shape, the first inclined surface 129 and the second inclined surface 124 extend with an equal distance therebetween. Accordingly, when the light which is reflected on the first inclined surface 129 arrives at the second inclined surface 124, an incident angle of the light on the first inclined surface 129 and an incident angle of the light on the second inclined surface 124 become substantially equal to each other. Since, the incident angle of the light is not changed between the first inclined surface 129 and the second inclined surface 124, the light can repeat the total reflection in the inclined portion 128.

That is, to consider a case in which the first inclined surface 129 and the second inclined surface 124 are not inclined in the same direction and, at the same time, are not arranged with an equal distance therebetween, even when the light is totally reflected on the first inclined surface 129, upon the arrival of the light to the second inclined surface 124, the incident angle is smaller than a critical angle and hence, there arises a drawback that the light is radiated from the inclined portion 128.

FIG. 5B shows a case in which the first inclined surface and the second inclined surface 124 are not formed in an S-shape, and are formed linearly on a light-entering-surface-125 side. In this case, the first inclined surface 129 and the second inclined surface 124 orthogonally intersect with the light entering surface 125 and hence, the light entering surface 125 is inclined at a specific angle with respect to the upper surface 121 and the lower surface 122. Further, since the light entering surface 125 is inclined, the LED 150 is also arranged in an inclined manner.

Here, in FIG. 5A, the inclined portion 128 is formed in an S-shape and hence, the first inclined surface 129 and the second inclined surface 124 are arranged parallel to the upper surface 121 and the lower surface 122 respectively in the vicinity of the light entering surface 125. Further, the LED is also arranged parallel to the upper surface 121 and the lower surface 122.

Figure 6:
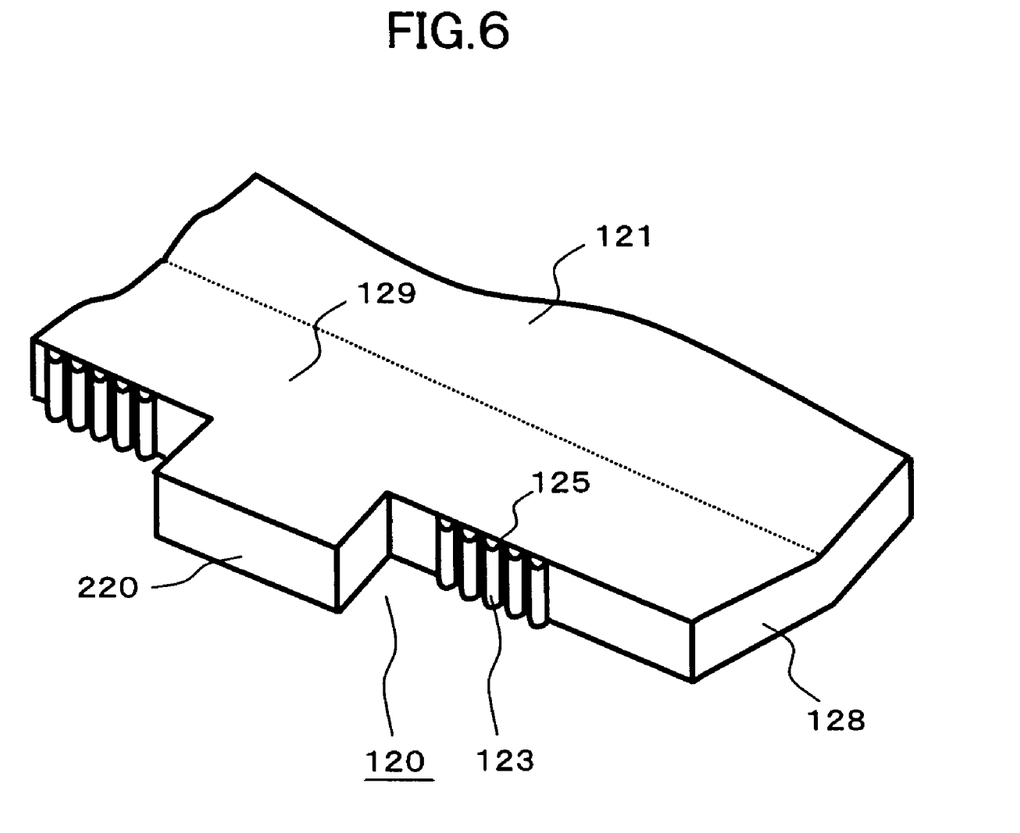
FIG. 6 is a schematic perspective view showing the vicinity of the light entering surface of the light guide plate of the liquid crystal display device of the embodiment according to the present invention.

Next, FIG. 6 shows lenses 123 which are mounted on the light entering surface 125. The lens 123 is formed by vertically arranging a plurality of members each of which is formed in a shape obtained by vertically cutting a columnar shape in half or in a triangular prism shape. Further, the lens 123 is formed in a fine and complicated shape compared to the shape of neighboring projecting portion 220. As shown in FIG. 6, the lenses 123 and the projecting portions 220 are alternately arranged in a state that the lens 123 is sandwiched between the projecting portions 220 and the projecting portion 220 is sandwiched between the lenses 123.

The lens 123 is provided for widely diffusing the light incident from the light entering surface 125, and is effectively applicable to the uniform distribution of the light in the inside of the light guide plate 120 when the LEDs 150 which constitute spot light sources are arranged in a dispersed manner.

Figure 7:
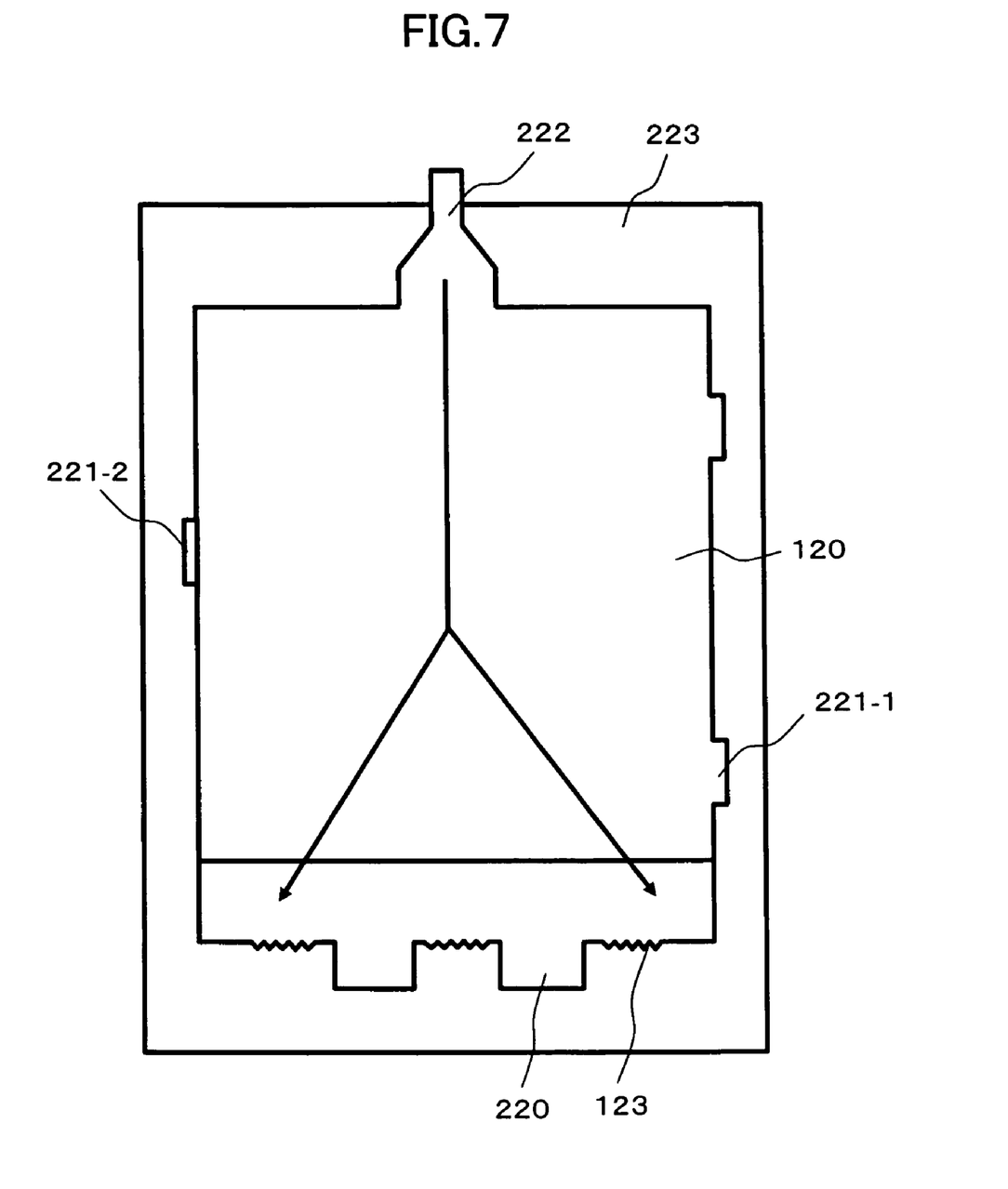
FIG. 7 is a schematic cross-sectional view showing a mold for forming the light guide plate of the liquid crystal display device of the embodiment according to the present invention by molding.

Next, a method of manufacturing the light guide plate 120 by injection molding is explained in conjunction with FIG. 7. As described previously, the light guide plate 120 is formed using a light transmitting resin, and as a method of manufacturing the light guide plate 120, a method which forms the resin-made light guide plate 120 by injection molding using a mold is adopted.

FIG. 7 shows a cross section of a mold 223, wherein a molten resin is injected into the mold 223 through a gate 222. The thickness of the light guide plate 120 is made uniform and hence, the resin which enters the mold 223 through the gate 222 flows in the inside of the mold 223 at a uniform pressure as indicated by an arrow and arrives at the lenses 123 and the projecting portions 220 which are arranged on a surface of the mold 223 opposite to the gate 222.

Numeral 221 indicates fixing projections for mounting the light guide plate 120. The fixing projections 221-1 are contiguously formed with the upper surface 121 of the light guide plate 120, and the fixing projection 221-2 is contiguously formed with the lower surface 122 of the light guide plate 120.

Figure 8A:
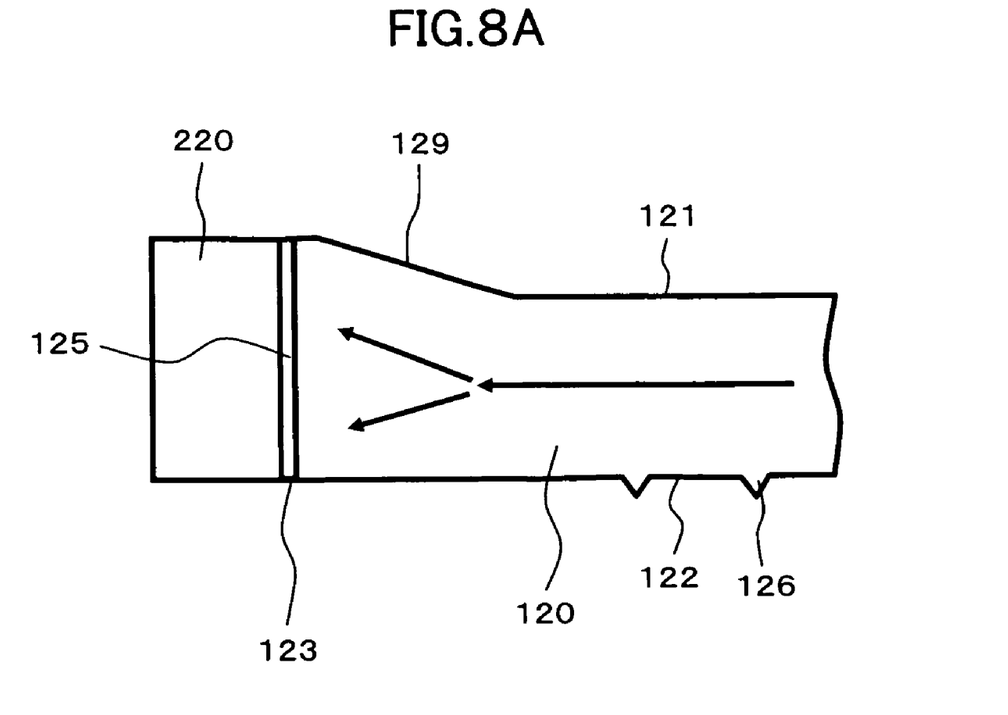
FIG. 8A and FIG. 8B are schematic cross-sectional views showing the vicinity of the light entering surface of the light guide plate of the liquid crystal display device of the embodiment according to the present invention.

Next, FIG. 8 shows the flow of the resin in the vicinity of the light incident surface 125. Although the resin flows as indicated by an arrow in the drawing, as shown in FIG. 8A, when the thickness of the light guide plate 120 is increased at the inclined surface 129, the pressure of the resin flow is dispersed. Accordingly, the pressure necessary for filling the resin in a shape of the lens 123 is decreased thus giving rise to a drawback that it is difficult to form the lens 123 with high accuracy.

Figure 8B:
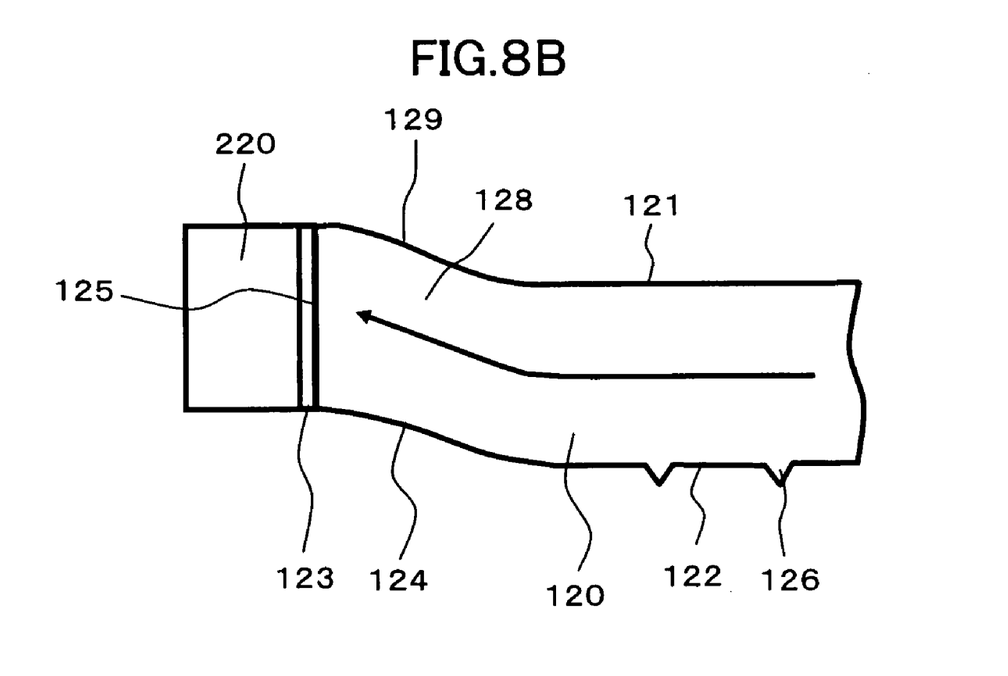

Accordingly, as shown in FIG. 8B, the inclined portion 128 having the first inclined surface 129 and the second inclined surface 124 is formed on the light guide plate 120 thus preventing a change of the thickness of the light guide plate 120 in the vicinity of the light entering surface 125. Since the pressure of resin flow becomes uniform, the lenses 123 can be formed with accuracy.

Particularly, when the projecting portion 220 is arranged close to the lens 123, a portion of the mold corresponding to the projecting portion 220 is largely opened with respect to the lens 123 and hence, the resin easily flows into the projecting portion 220. Accordingly, a drawback that a shape of the lens 123 is not transferred to the light guide plate 120 with high accuracy becomes conspicuous.

Accordingly, in the light guide plate 120 in which the projecting portions 220 are arranged with the lens 123 sandwiched therebetween, by keeping the pressure of resin flow uniform with the provision of the inclined portion 128, it is possible to form the lenses 123 with accuracy.

Figure 9:
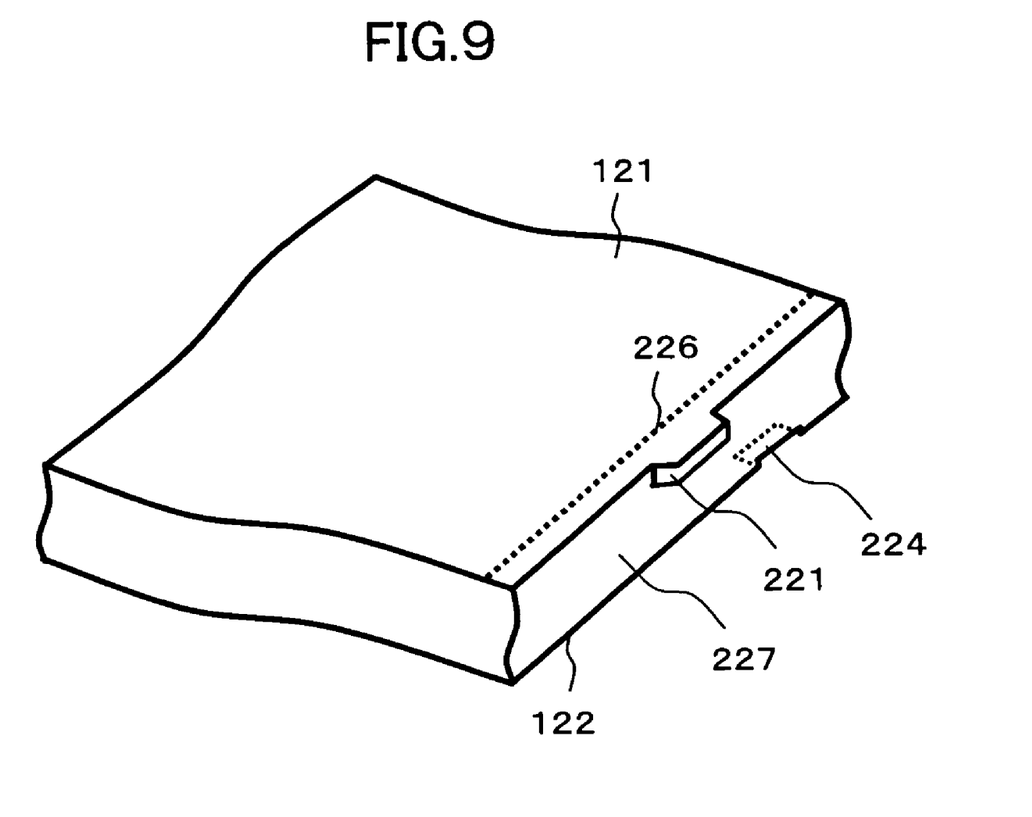
FIG. 9 is a schematic view showing a side surface of the light guide plate of the liquid crystal display device of the embodiment according to the present invention.

FIG. 9 shows an example of the light guide plate 120 which forms the fixing projection 221 on a side surface 227 thereof. Although the light guide plate 120 includes the upper surface 121 and the lower surface 122 as described previously, the light guide plate 120 includes the side surface 227 along the thickness direction thereof which connects the upper surface 121 and the lower surface 122.

The side surface 227 has a width which falls within a range from 1.0 mm to 0.2 mm. This width is substantially equal to the thickness of the light guide plate 120. The fixing projection 221 formed on the side surface 227 is formed in a fine shape. Further, as shown in FIG. 8, the fixing projection 221 projects in the direction orthogonal to the flow direction of the resin and hence, there exists a drawback that it is difficult to uniformly apply the pressure necessary for filling the resin. Further, the fixing projection 221 is formed in a shape that the resin is fitted in the mold 223 and hence, there also arises a drawback that the light guide plate 120 is hardly taken out from the mold 223.

Figure 10A:
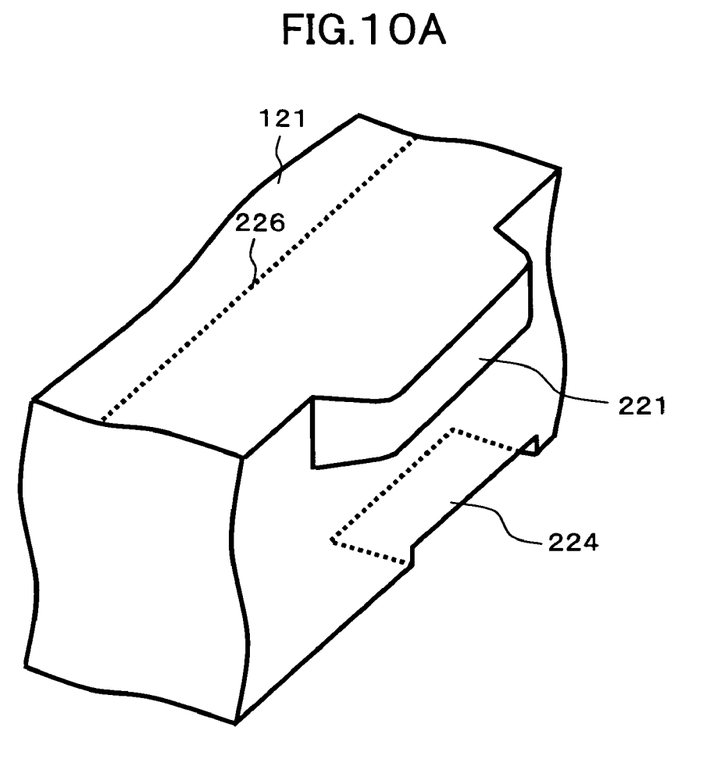
FIG. 10A and FIG. 10B are schematic plan views showing a fixing projection of the light guide plate of the liquid crystal display device of the embodiment according to the present invention.
Figure 10B:
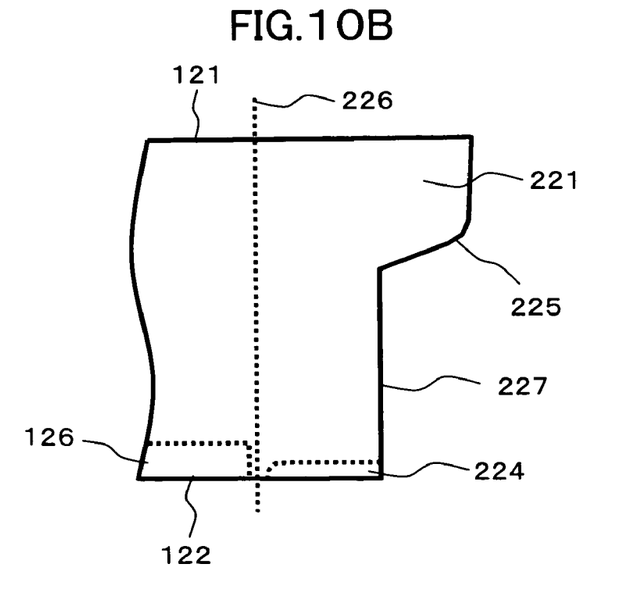

Accordingly, the fixing projection 221 has a chamfered shape. FIG. 10A and FIG. 10B are enlarged views of the fixing projection 221, wherein FIG. 10A is the perspective view and FIG. 10B is the cross-sectional view.

As shown in FIG. 10B, a tapered portion 225 is formed on a lower surface side of the fixing projection 221 which is formed on an upper surface 121 side of the light guide plate 120. Due to the tapered portion 225, the resin can easily flow into the fixing projection 221. Further, due to the tapered portion 225, the light guide plate 120 can be easily taken out from the mold 223.

Numeral 224 indicates an ejection-pin mark which is marked on the light guide plate 120 by an ejection pin which is formed on the mold 223 when the light guide plate 120 is taken out from the mold 223 by pushing. The ejection-pin mark 224 and the tapered portion 225 are formed in the direction opposite to the direction that the light guide plate 120 is taken out.

The ejection-pin mark 224 is a mark which is formed by pushing the light guide plate 120 which is fitted in the mold 223 using the ejection pin and hence, a resin surface is slightly recessed. To prevent light which is reflected on a corner portion of the ejection-pin mark from generating an undesired light, the ejection-pin mark 224 is also tapered.

Although the ejection-pin mark 224 is formed outside a dotted line 226 which is an imaginary line indicative of an effective area, by forming reflection-use grooves 126 in the effective area, the light is radiated uniformly toward the liquid crystal panel from the upper surface 121.

What is claimed is:

1. A liquid crystal display device comprising:
    a liquid crystal panel;
    a backlight which radiates light to the liquid crystal panel;
    a light emitting element which is mounted on the backlight; and
    a light guide plate on which light from the light emitting element is incident, wherein
    the light emitting element includes a light radiation surface from which light is emitted, a lower end of the light radiation surface, and side surfaces which intersect with the light radiation surface,
    the light guide plate includes a light entering surface which faces the light radiation surface of the light emitting element in an opposed manner and on which the light from the light emitting element is incident, a main surface which intersects with the light entering surface and from which the light is emitted, and an S-shaped inclined portion which extends toward the main surface from a light-entering-surface side, and
    the lower end of the light radiation surface is aligned with a lower end of the light entering surface.

2. A liquid crystal display device according to claim 1, wherein the light radiation surface of the light emitting element includes a light radiation portion, a thickness of the light radiation portion is smaller than a thickness of the light emitting element along the side surfaces, the thickness of the light emitting element along the side surfaces is larger than a thickness of the light guide plate at the main surface, and the thickness of the light radiation portion of the light emitting element is smaller than the thickness of the light guide plate at the main surface.

3. A liquid crystal display device according to claim 1, wherein a lens which diffuses light emitted from the light emitting element and allows the light to be incident on the light guide plate is formed on the light entering surface of the light guide plate.

4. A liquid crystal display device according to claim 1, wherein a fixing projection is formed on side surfaces of the light guide plate which intersect with the main surface of the light guide plate.

5. A liquid crystal display device comprising:
    a liquid crystal panel;
    a backlight which radiates light to the liquid crystal panel;
    a light guide plate mounted on the backlight; and
    a plurality of light emitting diodes arranged along a side surface of the light guide plate, wherein
    a columnar lens is mounted on a light incident surface thereof on which the light is incident from the light emitting diodes, a light radiation surface is formed on the side surface of the light guide plate at which a thickness of the light guide plate is smaller than a length of the columnar lens, and the light emitting diodes include a lower end of the light radiation surface,
    an inclined portion is formed between the light incident surface and the light radiation surface, and
    the lower end of the light radiation surface is aligned with a lower end of the light incident surface.

6. A liquid crystal display device according to claim 5, wherein the light emitting diode includes a light radiation portion which faces the light entering surface of the light guide plate in an opposed manner, and a thickness of the light radiation portion is smaller than a thickness of the light guide plate at the light radiation surface.

7. A liquid crystal display device according to claim 5, wherein the columnar lens which is formed on the light incident surface is arranged to face the light emitting diode in an opposed manner.

8. A liquid crystal display device according to claim 5, wherein a fixing projection is formed on a side surface of the light guide plate different from the light incident surface of the light guide plate.

9. A liquid crystal display device according to claim 5, wherein the fixing projection is formed on the side surface of the light guide plate different from the light incident surface of the light guide plate, and a tapered surface is formed on the fixing projection.

10. A liquid crystal display device comprising:

a liquid crystal panel; and a planar lighting device which radiates light to the liquid crystal panel, wherein the planar lighting device includes a light guide plate having a light radiation surface and a bottom surface which faces the light radiation surface in an opposed manner, the light guide plate includes side surfaces which intersect with the light radiation surface and the bottom surface, a plurality of LEDs include a lower end of the light radiation surface and are arranged along a first side surface of the light guide plate, the first side surface forms a light incident surface of the light guide plate by allowing light from the LEDs to be incident on the light guide plate from the first side surface, a scattering member is mounted on the bottom surface of the light guide plate for allowing light incident on the light guide plate to be directed toward a light-radiation-surface side, and to be radiated from the light radiation surface, a thickness of the LEDs is set larger than a distance between the light radiation surface and the bottom surface of the light guide plate, a first inclined surface is formed between the light incident surface and the light radiation surface, a second inclined surface is formed between the light incident surface and the bottom surface, the first inclined surface and the second inclined surface are inclined in the same direction, and the lower end of the light radiation surface is aligned with a lower end of the light incident surface.

11. A liquid crystal display device according to claim 10, wherein a columnar lens is formed on the light incident surface.

12. A liquid crystal display device according to claim 10, wherein a second side surface is arranged close to the first side surface, and a fixing projection is formed on the second side surface.

* * * * *